United States Patent Office 3,462,499
Patented Aug. 19, 1969

3,462,499
PREPARATION OF ACETYLENIC GLYCOLS
Robert J. Tedeschi, Whitehouse Station, N.J., and George S. Clark, Jr., Orono, Maine, assignors to Air Reduction Company, Incorporated, New York, N.Y., a corporation of New York
No Drawing. Filed Dec. 30, 1966, Ser. No. 605,981
Int. Cl. C07c 33/02
U.S. Cl. 260—635                                   10 Claims

ABSTRACT OF THE DISCLOSURE

Secondary acetylenic glycols are prepared by reacting in a first stage in ether solvent at 5–20° C., an acetylenic hydrocarbon, an alkali metal hydroxide and one half of the aldehyde normally stoichiometrically required to prepare the glycol and thereafter adding the second half of the aldehyde required at a temperature of 25–35° C. Alternately the glycols are prepared by reacting in a first stage in ether solvent at 5–20° C., an acetylenic alcohol and an alkali metal hydroxide and thereafter adding at a temperature of 25–35° C., the aldehyde required.

---

This invention relates to the preparation of hydroxylacetylenic compounds and is more particularly concerned with the preparation of secondary acetylenic glycols by a process involving the reaction of an acetylenic compound with an aldehyde in the presence of an alkali metal hydroxide.

It has been heretofore proposed that acetylenic alcohols be prepared by the so-called Favorsky reaction by interreacting acetylene and a carbonyl compound in the presence of potassium hydroxide and in the presence of a reaction medium. However, while such prior operations have made it possible to produce acetylenic carbinols, they have not been generally satisfactory for the production of acetylenic glycols and this is particularly true of secondary acetylenic glycols. Attempts to produce acetylenic glycols by the Favorsky reaction, or related reactions, have produced large quantities of acetylenic carbinols and only limited quantities of the glycols. Attempts to produce secondary acetylenic glycols by this route have generally failed, the principal products being aldols derived from self-condensation of the aldehyde starting materials. The only method reported to work with any degree of success is one involving a Grignard reagent, wherein acetylene dimagnesium bromide is reacted with an aldehyde (Marvel et al., J. Am. Chem. Soc., 61, 2716, (1939)). This Grignard route, however, is non-economic from a commercial standpoint, and requires the recovery and processing of the magnesium bromide so that it may be reused. Consequently, the economics of these prior processes are dependent, in large measure, upon the capital investment necessary to process and recover magnesium bromide, the amount of magnesium bromide required in the process, and the amount of this expensive reagent necessarily lost in the course of operation.

It is, accordingly, an object of the present invention to provide an improved process for preparing secondary acetylenic glycols.

It is another object of the invention to provide a process of the character indicated wherein high yields of the secondary glycols can be obtained with minimum formation of aldols, or acetylenic carbinols and without need for Grignard reagents or like expensive reagents.

In accordance with the present invention, it has been found that secondary acetylenic glycols can be efficiently and economically prepared from an aldehyde and an acetylenic compound, e.g. an acetylenic hydrocarbon such as acetylene, or a secondary acetylenic carbinol, using an alkali metal hydroxide as catalyst, by conducting the reaction in an ether under very specific and critical temperatures and concentrations. Suitable ethers containing 4 to 10 carbon atoms, preferably aliphatic or cycloaliphatic ethers having boiling points at atmospheric pressure within the range of about 35° to 150° C. Dioxane and diisopropyl ether are particularly preferred. Since the reaction when conducted in the ether under the critical temperature and concentration conditions requires only an alkali metal hydroxide as catalyst, the process is wholly economical and, indeed, an important advantage of the invention is that inexpensive potassium hydroxide can be effectively used. Alkali metal hydroxides other than potassium hydroxide can also be used, but it is preferred to employ potassium hydroxide. These results are contrary to previous general experience with the Favorsky reaction. While we do not wish to be bound by a particular theory, it appears that the ether activates the action of the alkali metal hydroxide in bringing about reaction of an acetylene compound with an aldehyde to form secondary glycols in preference to aceylenic carbinols, and this activating action exists only at very specific temperatures and concentrations.

The preferred acetylenic hydrocarbon for use in the invention is acetylene and in the following description of the invention reference will be made to acetylene. It is to be understood that other acetylenic hydrocarbons can, however, be employed in the practice of the invention to make secondary acetylenic glycols. Thus, in general, there can be employed as the acetylenic hydrocarbon a compound of the formula R—C≡C—H, where R is hydrogen or a hydrocarbon radical such as alkyl, alkenyl, alkynyl, cycloalkyl, aryl and alkaryl. Preferably, when R is a hydrocarbon radical, R contains 1 to 10 carbon atoms, such as an alkyl radical containing 1 to 10 carbon atoms, an alkenyl radical containing 2 to 10 carbon atoms, a cycloalkyl radical containing 6 to 10 carbon atoms, an aryl radical containing 6 to 10 carbon atoms, or an aralkyl radical containing 7 to 10 carbon atoms. Specific examples of acetylenic hydrocarbons other than acetylene itself which may be used in preparing acetylenic alcohols in accordance with this invention are methyl acetylene, ethyl acetylene, propyl acetylene, hexyl acetylene, and like alkyl acetylenes, vinyl acetylene, isopropenyl acetylene and like alkenyl acetylenes, diacetylene and like alkynyl acetylenes, cyclohexyl acetylene, methylcyclohexyl acetylene and like cycloalkyl acetylenes, phenyl acetylene, tolyl acetylene, xylyl acetylene and like aryl acetylenes, and benzyl acetylene, phenylethyl acetylene, methylbenzyl acetylene and like alkaryl acetylenes.

In like manner, various secondary acetylenic carbinols can be used in the practice of the invention. Thus, in general, there can be employed secondary acetylenic carbinols of the formula

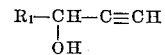

wherein $R_1$ is hydrogen or a hydrocarbon radical such as alkyl, alkenyl, alkynyl, cycloalkyl, aryl and alkaryl. Preferably when $R_1$ is a hydrocarbon radical, $R_1$ contains 1 to 10 carbon atoms, such as an alkyl radical containing 1 to 10 carbon atoms, an alkynyl radical containing 1 to 10 carbon atoms, a cycloalkyl radical containing 6 to 10 carbon atoms, an aryl radical containing 6 to 10 carbon atoms, or an aralkyl radical containing 7 to 10 carbon atoms.

Specific examples of secondary acetylenic carbinols corresponding to the foregoing formula include 1-butyn-3-ol
1-pentyn-3-ol 1-hexyn-3-ol
4-methyl-1-pentyn-3-ol
1-heptyn-3-ol
1-octyn-3-ol
4-ethyl-1-octyn-3-ol
1-nonyn-3-ol
1-decyn-3-ol
3-phenyl-1-propyn-3-ol
3-cyclohexyl-1-propyn-3-ol While an aldehyde can be reacted with an acetylenic compound in accordance with the present invention to prepare a secondary acetylenic glycol, those aldehydes are preferred which may be represented by the following general formula

wherein $R_2$ is a radical selected from the group consisting of alkyl such as ethyl, propyl, butyl, isopropyl, isobutyl, tertiary butyl, hexyl, and like alkyl groups containing from 2 to 20 carbon atoms; cycloalkyl such as cyclopropyl, cyclohexyl, and like cycloalkyl groups containing 3 to 10 carbon atoms; aryl such as phenyl, xylyl, tolyl, and like aryl groups containing 6 to 12 carbon atoms; hydroxyalkyl such as hydroxymethyl, hydroxyethyl, and like groups containing 1 to 20 carbon atoms; hydroxycycloalkyl such as hydrocyclohexyl ($HO-C_6H_{10}-$) and like groups containing 3 to 10 carbons atoms; alkoxyalkyl such as methoxy-methyl $$(CH_3-O-CH_2-)$$

methoxymethyl ($CH_3-O-CH_2H_4-$), ethoxybutyl $$(C_2H_5-O-C_4H_8-)$$

and like groups containing 2 to 20 carbon atoms; and alkoxycycloalkyl such as methoxycyclohexyl $$(CH_3-O-C_6H_{10}-)$$

propoxycyclopentyl ($C_3H_7-O-C_5H_8-$), and groups containing 4 to 20 carbon atoms. Thus, suitable aldehydes include acetaldehyde, propionaldehyde, butyraldehyde, isobutyraldehyde, isooctylaldehyde, benzaldehyde, and other commercially available aldehydes.

The alkali metal hydroxide employed is preferably of about 90% or higher purity and finely-divided; i.e. 80–100 mesh or higher, and preferably contains less than 5% water. Less pure grades of alkali metal hydroxides or coarser alkali metal hydrides may be used, although the reaction rate will tend to be somewhat slower and conversions will tend to be lower with these materials. As already pointed out above, any alkali metal hydroxide can be employed, although increased conversions and yields are obtainable with potassium hydroxide and sodium hydroxide and they are preferred for this reason.

Generally, the secondary acetylenic glycol is prepared by suspension or otherwise dispersing the alkali metal hydroxide in a predetermined amount of ether to form a slurry, introducing a predetermined amount of the acetylenic compound, e.g. acetylene, into the slurry, and then adding the aldehyde. Most advantageously, the alkali metal hydroxide is thoroughly mixed and beaten into the ether, e.g. by means of a Waring blender. The acetylenic compound and aldehyde can also be added simultaneously to the alkali metal hydroxide ether slurry. In a less preferred operating procedure, the aldehyde and the alkali metal hydroxide can be dispersed in the ether and the acetylenic compound then added. Advantageously, the reaction zone is freed from air before the ether, acetylenic compound and aldehyde are introduced. This is suitably effected by sweeping the reaction zone with an inert gas, such as nitrogen.

After the reaction is completed, excess acetylene is vented and removed, and the reaction mixture is hydrolyzed in the presence of an inert organic solvent, and the secondary acetylenic obtained is separated. An inert organic solvent may be used for this purpose but preferably a lower alkyl ether is employed, i.e. an ether of the formula $R_3-O-R_4$ wherein $R_3$ and $R_4$ are the same or different alkyl radicals of 1 to 6 carbon atoms, such as diethyl ether, methyl ethyl ether, diisopropyl ether, and the like. Hydrolysis of the reaction mixture is readily accomplished by adding water to it, separating the water layer from the organic layer and then treating the layer or layers containing the secondary acetylenic glycol by carbonation with carbon dioxide, by acidification with a dilute mineral acid, such as, dilute sulfuric acid or hydrochloric acid, by means of ion exchange resins, acid salts, or any of the other techniques well known in the art. Thus, in the case of water-soluble secondary acetylenic glycols, the water layer is treated, and in the case of non-water-soluble secondary acetylenic glycols, the organic layer is treated. In some cases, both may be treated alternatively. The method by which the secondary acetylenic glycol is finally recovered will depend, primarily, upon the physical nature of the reaction mixture, and generally, will involve either extraction, e.g. with a lower alkyl ether, or filtration and distillation The reaction may be run batchwise or continuously.

When the secondary acetylenic glycol is formed from acetylene or other acetylenic hydrocarbon and an aldehyde, the reaction is carried out in two stages. The first stage is carried out at 5–20° C. and corresponds to the formation of the ethynyl carbinol and of an ethynyl carbinol-alkali metal hydroxide adduct, and involves the addition of ½ the aldehyde. The optimum temperature for the second stage (diol formation) is 25–35° C. The use of high reaction temperatures, e.g. 45–60° C., yields no diol, but only large amounts of aldol and acetylenic polyol byproducts. The adverse effect of higher temperatures is apparently due to base-catalyzed cleavage and the instability of the intermediate alkali metal acetylenic carbinol and glycol. When the secondary acetylenic glycol is produced from an acetylenic carbinol and an aldehyde, e.g. corresponding to the second stage referred to above, the first stage corresponds to the formation of the ethynyl carbinol-alkali metal hydroxide adduct, with no aldehyde addition. It is, however, effected at 5–20° C. The second stage temperature of 25 to 35° C. is employed for the entire period of aldehyde addition. The second stage is exothermic, and cooling is used during aldehyde addition to maintain the critical temperature range.

The reaction loading or concentration is defined as the gram moles of aldehyde or other reagent used in a volume of at least 300 cc. of ether, preferably 300 cc. to 1000 cc. In the case of diol formation from an acetylenic hydrocarbon, the optimum molar ratio of aldehyde: alkali metal hydroxide:acetylene has been found to be 1:1.5:0.52. When an acetylenic carbinol is user, as the initial acetylenic compound, instead of an acetylenic hydrocarbon, the optimum molar ratio of aldehyde:alkali metal hydroxide:acetylenic carbinol is 1:1.5:1.05. Thus, in accordance with the invention, the loading or concentration of aldehyde should be 0.75 to 1.5 gram moles, the concentration of alkali metal hydroxide should be 1.2 to 1.8 gram moles, the concentration of acetylenic hydrocarbon should range between 0.4 and 0.8 gram mole, and the concentration of ethynyl carbinol when used as the starting material should range between 0.8 and 1.6 gram moles. Preferably, the lower amounts of the several components are used together and, similarly, the higher amounts of the several components are used together. Any substantial deviation from these ranges leads to greatly inferior results.

The aldehyde should be added dropwise. The ether-alkali metal hydroxide slurry is first presaturated with acetylene or acetylenic hydrocarbon before aldehyde addition is started. The acetylenic hydrocarbon addition time is suitably about 30 minutes for each stage. In practice, before the second half (beginning of second stage) of aldehyde addition is started, the theoretical amount of acetylene should be present, and the temperature allowed to rise to 25-35° C.

Commercial aldehydes may contain substantial quantities of impurities. Consequently, these aldehydes should be redistilled, e.g. through a column of 20-30 plates, preferably under vacuum (100-200 mm.). The aldehyde used in the reaction should have an average minimum purity of 90-95%.

Thus, in the direct formation of secondary acetylenic glycols, viz. from an acetylenic hydrocarbon, e.g. acetylene, and an aldehyde, the following is a typical reaction charge:

| | | |
|---|---|---|
| Redistilled aldehyde (90% min. purity) | mole | 1.0 |
| KOH (pre-ground in dioxane) (90% min. purity) | do | 1.5 |
| Dry ether | cc | 300-600 |
| Acetylene (metered in) | mole | 0.52-0.55 |

The reaction temperature during the addition of the first half of the aldehyde (in situ formation of secondary ethynyl carbinol-KOH complex) is most advantageously kept at 10-15° C. to insure maximum stability and conversion to the ethynyl carbinol intermediate. The addition is best halted for 15 min. at the half-way stage, to effect complete reaction, before raising the temperature to the diol range (25-35° C.). It is important during the first half of aldehyde addition that the acetylene concentration be equal to or slightly (5-10%) greater than that of the carbonyl compound to favor maximum complex formation. It is also preferable to avoid any significant excess over the 0.52-0.55 mole acetylene range.

When secondary acetylenic glycols are prepared by using a secondary ethynyl carbinol as the acetylenic compound, the following is a typical reaction charge:

| | | |
|---|---|---|
| Aldehyde, redistilled (90% min. purity) | mole | 0.52 |
| Secondary ethynyl carbinol | do | 0.50 |
| Alkali metal hydroxide (pre-ground in solvent), e.g. KOH (90% min. purity) | do | 0.50-0.75 |
| Dry ether | cc | 300-600 |

The addition of secondary ethynyl carbinol to the KOH slurry is most advantageously carried out at 10-12° C. during the addition of the first 5-10% of carbinol and is best kept below 15° C. for the remainder of the addition. For best results, the temperature is lowered to 0 to −5° C. and held there for at least 15 min. after the first stage of reaction (KOH complex formation) is completed. The reaction temperature is then raised to 20° C. before commencing the addition of aldehyde. The reaction is exothermic and the temperature quickly rises to 28° C. The optimum reaction temperature for diol formation is 28-35° C.

The invention will now be described by reference to specific examples of practical application.

EXAMPLE 1

Reaction of 4-methyl-1-pentyn-3-ol and iso-butyraldehyde

The KOH (0.75 mole, 100% basis) was first pre-ground in a stainless steel Waring blender at high speed for 3-5 min. using 200 cc. dioxane. The finely-divided base-slurry was quickly transferred to a one-liter reactor prepurged with nitrogen and protected from atmospheric moisture. The blender was quickly rinsed with two 50 cc. portions of the dry solvent to make a total solvent volume of 300 cc. All weighings of KOH were carried out in the dry box (relative humidity 0%), as well as charging of the blender. Redistilled aldehyde and dry solvent (stored over molecular sieves) were used to avoid the adverse effects of water.

The ethynyl carbinol (0.50 mole, 100% basis) was gradually added during 15-30 min. to the well stirred KOH slurry at 5-10° C. The reaction was moderately exothermic, and a light yellow, stirrable slurry resulted on completion of the addition. Fifteen minutes after carbinol addition, the addition of isobutyraldehyde (0.52 mole, 100% basis) was begun after first raising the temperature to about 25° C. The resulting reaction was noticeably exothermic, and the temperature was controlled by occasional water cooling in the 28-34° C. range.

The reaction mixture was stirred a total of 4-5 hours, cooled to 10-20° C., and treated during 5 min. with 75-100 cc. water to decompose the reaction complex. Initial thickening was noted during the addition of the first 20 cc. of water, whereupon the complex was completely dissolved on complete addition and stirring for 5-10 min. at 20-30° C. The temperature during and after hydrolysis should not be allowed to rise above 30° C., nor should the hydrolysis mixture be stirred more than about 10 minutes to avoid excessive base-catalyzed cleavage of the diol. The stirrer was halted, the layers separated, and the upper organic layer treated with small pieces of solid carbon dioxide for 5 minutes with good stirring. The organic layer formed a super-saturated solution of potassium bicarbonate which suddenly precipitated after standing five or more minutes as a white slurry. The slurry was filtered and the filter cake washed several times with solvent.

The resulting organic solution was distilled first at atmospheric pressure to remove solvent and water up to a pot temperature of 120-130° C. The remainder of the distillation was then carried out under gradually decreasing pressure. The following average distillation pattern was observed:

| Fraction: | Head temp. (°C.) |
|---|---|
| 1 | 88-105 |
| 2 | 80-65/200 mm.-100 mm. |
| 3 | 40-110/0.5 mm. |
| 4 | 112-116/0.5 mm. |

Fraction 4 was composed of 2.7-dimethyl-4-octyne-3,6-diol and averaged 50-55 g. of distilled material.

EXAMPLE 2

Simultaneous addition of 4-methyl-1-pentyn-3-ol- and iso-butyraldehyde to KOH-dioxane The preparation and batch size of the KOH-dioxane slurry was the same as described in Example 1. A solution of 0.50 mole secondary methyl pentynol and 0.50 mol iso-butyraldehyde was gradually added to the well stirred dioxane-KOH slurry at an initial temperature of 18° C. The resulting reaction was exothermic and the temperature following the formation of the KOH complex readily climbed to 30-33° C. The reaction became thick but was still stirrable after the one hour addition period. The isolation and separation of the product were the same as described in Example 1.

Attempts to isolate and purify secondary dimethyl octyne-diol produced in Examples 1 and 2 by crystallization of the crude pot residue after solvent removal gave only the higher melting isomer (M.P. 107-108° C.) which was isolated as white crystalline needles from hexane or petroleum ether. The lower melting isomer (M.P. 67-69° C.) was isolated by vacuum distillation of the pot residue of the mother liquor after solvent removal. This distilled isomer crystallized readily from hexane.

EXAMPLE 3

Reaction of 4-methyl-1-pentyn-3-ol and iso-butyraldehyde

KOH (0.75 mole, 100% basis) was first pre-ground in a stainless steel Waring blender at high speed for 3-5 min. using 200 cc. diisopropyl ether. The finely-divided base-slurry was transferred to a one-liter reactor prepurged with nitrogen and protected from atmospheric moisture. The blender was rinsed with two 50 cc. portions of the dry solvent to make a total solvent volume of 300 cc. All weighings of KOH were carried out in the dry box (relative humidity 0%), as well as charging of the blender. Redistilled aldehyde and dry solvent (stored over molecular sieves) were used to avoid the adverse effects of water.

The 4-methyl-1-pentyn-3-ol (0.50 mole, 100% basis) was gradually added during 15–30 min. to the well stirred KOH slurry at 5–10° C. Fifteen minutes after carbinol addition, the addition of isobutyraldehyde (0.50 mole, 100% basis) was begun after first raising the temperature to about 25° C. The resulting reaction was noticeably exothermic, and the temperature was controlled by occasional water cooling in the 29–32° C. range.

The reaction mixture was stirred a total of 4 hours, cooled to 10–20° C., and treated during 5 min. with 75–100 cc. water to decompose the reaction complex. The reaction mixture was then worked up as described in Example 1.

There was recovered 2,7-dimethyl-4-octyne-3,6-diol of 98.6 purity in an amount representing a conversion of 59%.

EXAMPLE 4

Direct formation of 2,7-dimethyl-4-octyne-3,6-diol

REACTION CHARGE

| | | |
|---|---|---|
| Iso-butyraldehyde | moles | 1.0 |
| Pre-ground KOH | do | 1.5 |
| Dioxane | cc | 300 |

The KOH was pre-ground in dioxane as outlined in Example 1, and the temperature adjusted at 15–20° C. Acetylene was gradually metered into the well-stirred slurry, using entrance and exit wet test meters. The wet acetylene emerging from the entrance meter was dried through a two-foot alumina column, a calcium carbide tower and finally an alumina tower before being bubbled below the surface of the stirred KOH-dioxane slurry. The adsorption of acetylene was slightly exothermic and occasional cooling was needed to maintain a temperature of 15° C. Saturation, as evidenced by gas evolution on the exit meter, took place at about 4.7–5.0 liters acetylene per 300 ml. dioxane.

The reaction temperature was then controlled at about 15° C. during the addition of the first half of the aldehyde (0.5 mole) to form mainly the corresponding ethynyl carbinol-KOH complex without danger of aldolization of the aldehyde. During the remainder of the addition, the reaction temperature was allowed to rise and controlled at 28–34° C. The total addition time was about one hour, evenly divided at both temperature addition ranges. Acetylene was metered in gradually up to a total of 14 liters (0.56 mole) maintaining approximately the stoichiometry needed to form diol but avoiding a large excess. The reaction remained exothemic to 34° C. for about one hour after completion of addition. The total reaction time was 5 to 5½ hours.

The isolation and distillation techniques for the product diol was similar to that outlined in Example 1. The distillation data observed are tabulated below:

2,7-dimethyl-4-octyne-3,6-diol B.P.: Fraction—

| | | |
|---|---|---|
| 1 | deg | 58–70 |
| 2 | deg | 70–80/150–80 mm. |
| 3 | deg | 30–115/0.5 mm. |
| 4 | deg | 115–117/0.5 mm. |
| Wt. diol (Fraction 4) | | 64 |

Secondary dimethyl octynediol distills as a mixture of two isomers (dl-pair and meso), of melting points, 67–69° C. and 102–104° C., respectively. The resulting crystalline product has a setting point (crystallization temperatures from its melt) of 74° C.

EXAMPLE 5

Example 4 was repeated except that 1 mole of n-butyraldehyde was substained for the iso-butyraldehyde used in the preceding example.

The distillation data of the reaction mixture were as follows:

5-decyne-4,7-diol B.P.: Fraction—

| | | |
|---|---|---|
| 1 | deg | 87–105 |
| 2 | deg | 56–62/150–90 mm. |
| 3 | deg | 72–65/45–18 mm. |
| 4 | deg | 126–131/0.5 mm. |
| Wt. diol (Fraction 4) | | 55 |

The product decynediol was a light yellow, viscous oil which showed no tendency to crystallize. Its physical properties (boiling point, index and physical state) agreed with literature values obtained for the product prepared by the Grignard route.

EXAMPLE 6

Direct formation of 4-octyne-3,6-diol

REACTION CHARGE

| | | |
|---|---|---|
| n-Propioaldehyde | moles | 1.0 |
| Pre-ground KOH | do | 1.5 |
| Dioxane | cc | 300 |

The KOH was pre-ground in dioxane as outlined in Example 1, and the temperature adjusted at about 12–20° C. Acetylene was gradually metered into the well-stirred slurry, using entrance and exit wet test meters. The wet acetylene was dried as described in Example 3 and bubbled into the stirred slurry until the latter was saturated. Cooling was applied where necessary to maintain the reaction temperature below 20° C.

The reaction temperature was then controlled at about 15° C. during the addition of the first half of the aldehyde (0.5 mole) to form mainly the corresponding ethynyl carbinol-KKOH complex without danger of aldolization of the aldehyde. During the remainder of the addition, the reaction temperature was allowed to rise and controlled at 28–35° C. The total addition time was about one hour, evenly divided at both temperature addition ranges. Acetylene was metered in gradually up to a total of 13 liters (0.52 mole) maintaining approximately the stoichiometry needed to form diol but avoiding a large excess. The reaction remained exothermic to 34° C. for about one hour after completion of addition. The total reaction time was about 5½ hours.

Using the isolation and distillation techniques for the product diol outlined in Example 1, there was recovered 4-octyne-3,6-diol in an amount corresponding to a conversion of 54%. The diol was recovered with a purity of 96% and had physical properties agreeing with literature values. If twice the amount of diisopropyl ether is used in place of dioxane, conversions up to 70% can be realized, if the aqueous caustic layer is first neutralized and extracted with diisopropyl ether before distillation.

EXAMPLE 7

Direct formation of 5,10-diethyl tetradec-7-yne-6,9-diol

REACTION CHARGE

| | | |
|---|---|---|
| 2-ethyl hexaldehyde | moles | 0.5 |
| Pre-ground KOH | do | 1.5 |
| Dioxane | cc | 300 |

The KOH was pre-ground in dioxane as outlined in Example 1, and the temperature adjusted at about 12–20° C. Acetylene was gradually metered into the well-stirred slurry, using entrance and exit wet test meters. The wet acetylene was dried as described in Example 3 and bubbled into the stirred slurry until the latter was saturated. Cooling was applied where necessary to maintain the reaction temperature below 20° C.

The reaction temperature was then controlled at about 15° C. during the addition of the first half of the aldehyde (0.25 mole) to form mainly the corresponding ethynyl carbinol-KOH complex without danger of aldolization of the aldehyde. During the remainder of the addition, the reaction temperature was allowed to rise and controlled at 28–35° C. The total addition time was about one hour, evenly divided at both temperature addition ranges. Acetylene was metered in gradually up to a total of 14 liters (0.56 mole) maintaining approximately the stoichiometry needed to form diol but avoiding a large excess. The reaction remained exothermic to 34° C. for about one hour after completion of addition. The total reaction time was about 6 hours.

Using the isolation and distillation techniques for the product diol outlined in Example 1, there was recovered 5,10-diethyl tetradec-7-yne-6,9-diol in an amount corresponding to a conversion of 67%. The diol was recovered with a purity of 93% and had physical properties agreeing with literature values.

EXAMPLE 8

Direct formation of 2,7-dimethyl-4-octyne-3,6-diol

REACTION CHARGE

| | | |
|---|---|---|
| Iso-butyraldehyde | moles | 1.0 |
| Pre-ground KOH | do | 1.5 |
| Diisopropyl ether | cc | 600 |

The KOH was pre-ground in the ether and the temperature adjusted at about 15–20° C. Acetylene was gradually metered into the well-stirred slurry, using entrance and exit wet test meters. The wet acetylene emerging from the entrance meter was dried through a two-foot alumina column, a calcium carbide tower and finally an alumina tower before being bubbled below the surface of the stirred KOH-ether slurry. The adsorption of acetylene was slightly exothermic and occasional cooling was needed to maintain a temperature of 15° C. Saturation was evidenced by gas evolution on the exit meter.

The reaction temperature was then controlled at about 15° C. during the addition of the first half of the aldehyde (0.5 mole) to form mainly the corresponding ethynyl carbinol-KOH complex without danger of aldolization of the aldehyde. During the remainder of the addition, the reaction temperature was allowed to rise and controlled at 28–32° C. The total addition time was about one hour, substantially evenly divided at both temperature addition ranges. Acetylene was metered in gradually up to a total of 13 liters (0.52 mole) maintaining approximately the stoichiometry needed to form diol but avoiding a large excess. The total reaction time was 5 hours.

The isolation and distillation techniques for the product diol was similar to that outlined in Example 1. The 2,7-dimethyl-4-octyne-3,6-diol was recovered in 92% purity in an amount corresponding to a conversion of 70%.

While the foregoing examples use dioxane and diisopropyl ether as the reaction media, and these two ethers are preferred, particularly dioxane, comparable results are obtainable when other ethers falling within the definitions set forth above are substituted for the dioxane or the diisopropyl ether in these examples. Illustrative of such other ethers are diisobutyl ether, dipropyl ether, methyl ether of ethylene glycol, methyl ether of diethylene glycol, and the like. It will be understood, therefore, that the foregoing examples are illustrative only and are not to be taken as limitative of the invention, which is defined in the appended claims.

We claim:

1. A process for the preparation of secondary acetylenic glycols by the reaction of an acetylenic hydrocarbon which is acetylene or diacetylene with an aldehyde of the formula

wherein $R_2$ is an alkyl radical containing 2 to 20 carbon atoms, a cycloalkyl radical containing 3 to 10 carbon atoms, an aryl radical containing 6 to 12 carbon atoms, a hydroxyalkyl radical containing 1 to 20 carbon atoms, a hydroxycycloalkyl radical containing 3 to 10 carbon atoms, an alkoxyalkyl radical containing 2 to 20 carbon atoms, or an alkoxycycloalkyl radical containing 4 to 20 carbon atoms, which comprises treating said acetylenic hydrocarbon in the presence of an ether containing 4 to 10 carbon atoms in a first stage at a temperature of 5 to 20° C. with an alkali metal hydroxide in the amount of 1.2 to 1.8 gram moles per 300 to 1000 cc. of ether and with ½ of 0.75 to 1.5 gram moles of said aldehyde per 300 to 1000 cc. of said ether, and in a second stage at a temperature of 25 to 35° C. with ½ of 0.75 to 1.5 gram moles of said aldehyde per 300 to 1000 cc. of said ether, said acetylenic hydrocarbon being present in the amount of 0.4 to 0.8 gram mole per 300 to 1000 cc. of said ether.

2. A process as defined in claim 1, wherein the acetylenic compound is acetylene.

3. A process as defined in claim 1, wherein the concentration of aldehyde is about 1 gram mole, the concentration of alkali metal hydroxide is about 1.5 gram moles, and the concentration of acetylenic hydrocarbon is about 0.52 gram mole.

4. A process as defined in claim 1, wherein the ether is selected from the group consisting of dioxane and diisopropyl ether.

5. A process as defined in claim 1, wherein the ether is dioxane.

6. A process for the preparation of secondary acetylenic glycols by the reaction of a secondary acetylenic carbinol of the formula

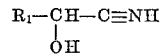

with an aldehyde of the formula

wherein $R_1$ is hydrogen, an alkyl radical containing 1 to 10 carbon atoms, an alkynyl radical containing 1 to 10 carbon atoms, a cycloalkyl radical containing 6 to 10 carbon atoms, an aryl radical containing 6 to 10 carbon atoms, or an aralkyl radical containing 7 to 10 carbon atoms, and $R_2$ is an alkyl radical containing 2 to 20 carbon atoms, a cycloalkyl radical containing 3 to 10 carbon atoms, an aryl radical containing 6 to 12 carbon atoms, a hydroxyalkyl radical containing 1 to 20 carbon atoms, a hydroxycycloalkyl radical containing 3 to 10 carbon atoms, an alkoxyalkyl radical containing 2 to 20 carbon atoms, or an alkoxycycloalkyl radical containing 4 to 20 carbon atoms, which comprises treating said acetylenic carbinol in the presence of an ether containing 4 to 10 carbon atoms in a first stage at a temperature of 5 to 20° C. with an alkali metal hydroxide in the amount of 1.2 to 1.8 gram moles per 300 to 1000 cc. of ether, and in a second stage at a temperature of 25 to 35° C. with 0.75 to 1.5 gram moles of said aldehyde per 300 to 1000 cc. of said ether, said secondary acetylenic carbinol being present in the amount of 0.8 to 1.6 gram moles per 300 to 1000 cc. of said ether.

7. A process as defined in claim 6, wherein $R_2$ is an alkyl radical containing 1 to 10 carbon atoms.

8. A process as defined in claim 6, wherein the concentration of aldehyde is about 1 gram mole, the concentration of alkali metal hydroxide is about 1.5 gram moles, and the concentration of acetylenic carbinol is about 1.05 gram moles.

9. A proces as defined in claim 6, wherein the ether is selected from the group consisting of dioxane and diisopropyl ether.

10. A process as defined in claim 6, wherein the ether is dioxane.

References Cited

UNITED STATES PATENTS

| | | |
|---|---|---|
| 2,385,548 | 9/1945 | Smith. |
| 2,479,692 | 8/1949 | Morey et al. |
| 2,488,082 | 11/1949 | Gottfried et al. |
| 2,777,884 | 1/1957 | Rutledge et al. |
| 2,848,520 | 8/1958 | Rutledge. |

BERNARD HELFIN, Primary Examiner

J. E. EVANS, Assistant Examiner

U.S. Cl. X.R.

260—611, 615, 617, 618, 631, 632

PO-1050
(5/69)

UNITED STATES PATENT OFFICE
CERTIFICATE OF CORRECTION

Patent No. 3,462,499  Dated August 19, 1969

Inventor(s) Robert J. Tedeschi and George S. Clark, Jr.

It is certified that error appears in the above-identified patent and that said Letters Patent are hereby corrected as shown below:

Col. 2, line 21, "aceylenic" should read -- acetylenic --.

Col. 3, line 34, "methoxymethyl" should read -- methoxyethyl --;
line 49, "hydrides" should read -- hydroxides --;
line 57, "suspension" should read -- suspending --.

Col. 4, line 1, after "acetylenic" insert -- glycol --;
line 54, "user" should read -- used --.

Col. 6, line 41, "2.7" should read -- 2,7 --.

Col. 7, line 12, "$_1$0.50" should read -- (0.50 --;
line 69, "64" should read -- 64 g. --.

Col. 8, line 12, "55" should read -- 55 g. --;
line 24, "n-Propioaldehyde" should read -- n-Propionaldehyde;
line 38, "KKOH" should read -- KOH --.

Col. 10, line 35 in the formula "≡NH" should read -- ≡CH --;
line 73, "proces" should read -- process --.

SIGNED AND
SEALED
MAY 19 1970

(SEAL)
Attest:

Edward M. Fletcher, Jr.
Attesting Officer

WILLIAM E. SCHUYLER, JR.
Commissioner of Patents